3,192,239
PROCESS FOR ADDITION OF ARYLTHIOLS, PHENOLS AND PHENYL ETHERS TO UNSATURATED FATTY ACIDS
Waldo C. Ault and Abner Eisner, Glenside, Pa., assignors to the United States of America as represented by the Secretary of Agriculture
No Drawing. Filed Apr. 2, 1962, Ser. No. 184,608
14 Claims. (Cl. 260—399)
(Granted under Title 35, U.S. Code (1952), sec. 266)

A non-exclusive, irrevocable, royalty-free license in the invention herein described, throughout the world for all purposes of the United States Government, with power to grant sublicenses for such purposes, is hereby granted to the Government of the United States of America.

This application is a continuation-in-part of application bearing Serial No. 166,003, filed January 11, 1962, now abandoned.

This invention relates to a process for the addition of mercaptoaromatic or hydroxylated aromatic compounds to olefinically unsaturated fatty acids, and has among its objectives the preparation of aryl and polycyclic addition compounds to such fatty acids and esters thereof for use as lubricant additives and antioxidants.

Procedures employed heretofore to add aryl compounds such as phenols and arylthiols to olefinically unsaturated fatty acids have been generally unsatisfactory. The use of sulfuric acid as a condensing agent to bring about addition of a phenol to a double bond of an olefinically unsaturated fatty acid frequently gives low yields because of polymerization, sulfonation, oxidation, or other undesired reactions. Use of a non-oxidizing acid such as hydrochloric acid or phosphoric acid or a mixture of these acids does not give as good a result as that obtained with sulfuric acid. The result obtained when a sulfonic acid cation-exchange resin or a polyphosphoric acid is used as the catalyst is unpredictable; and, in the case of polyphosphoric acid, separation of the reaction product is difficult.

We have discovered that methanesulfonic acid may be used as a reaction medium and catalyst for the addition reactions of the present invention. When adding phenol to oleic acid not only are good yields of reasonably pure products obtained, but the product color is so satisfactory that purification to improve color is not necessary. The yields obtained with m-cresol, anisole, and p-t-butylcatechol are two to four fold those previously obtained with sulfuric acid. Moreover, by use of methanesulfonic acid catalyst it is possible to add polycyclic compounds such as 2-naphthalenethiol and 2-naphthol to oleic acid in good yield.

In general according to the present invention an olefinically unsaturated fatty acid, or an alkyl ester of an olefinically unsaturated fatty acid, preferably a short chain alkyl ester such as t-butyl, isopropyl, methyl or ethyl ester, is reacted with an amount of an arylthiol, a phenol, phenyl ether, naphthalenethiol, or a naphthol at least in excess of a molar equivalent of the fatty acid for each double bond in the unsaturated fatty acid, and with methanesulfonic acid to serve as the reaction medium and catalyst for the addition reaction, stirred at about room temperature until the reaction whereby the arylthiol, phenol, phenyl ether, naphthalenethiol, or naphthol adds at a double bond is substantially complete, and the arylthio, hydroxy aryl, alkoxy aryl, naphthalenethio or hydroxynaphthyl derivative of the fatty acid, or the alkyl ester thereof, is separated from the reaction mixture.

Alternatively, an alkyl ester product is obtained by preparing an addition derivative of the olefinically unsaturated fatty acid and esterifying this derivative of the fatty acid.

While the inventive process is exemplified with oleic acid, other olefinically unsaturated acids such as acrylic, crotonic, sorbic, tiglic, linoleic, linolenic, erucic, brassidic, and arachidonic may be used as the olefinically unsaturated fatty acid.

An excess of the arylthiol, phenol, phenyl ether, naphthalenethiol, or naphthol over that which can be added to the double bonds in the reaction mixture is desirable to minimize cross linking when the compound being added to the fatty acid has two or more hydroxyl functions. A ratio of about 2 to 4 moles of arylthiol, phenol, phenyl ether, naphthalenethiol, or naphthol to each mole of olefinically unsaturated fatty acid is preferred.

The compounds reacted with the olefinically unsaturated acids may be considered as mercaptoaromatic or hydroxylated aromatic compounds or derivatives thereof. These include monohydroxy benzene compounds such as phenol, cresol, xylenol, mesitol and thymol; dihydroxy compounds such as catechol, resorcinol, orcinol, t-butylcatechol, and dihydroxyxylol, monohydroxy naphthalene compounds such as 2-naphthol, and phenyl ethers such as methoxybenzene (anisole) and ethoxybenzene (phenetol). The sulphur containing compounds include benzenethiol, o-, m-, and p-toluenethiols, and 2-naphthalenethiol.

Optimum yields are obtained when the methanesulfonic acid is present with reactants in at least about a 6 to 1 mole ratio with respect to the unsaturated acid. While the reaction does proceed in the presence of lesser amounts of methanesulfonic acid, invariably the result is a lower yield of the desired product.

Typically the reactants and the methanesulfonic acid are combined at room temperatue, usually in the range of about 22–25° C., and stirred for several hours, usually about six hours. Since the reaction is only slightly exothermic, no external cooling is necessary. There is no particular advantage in stirring the reaction mixture more than six hours unless the operation is conducted at lower than room temperatures. Higher temperatures, such as heating on a steam bath, speed up the reaction and give somewhat higher yields of the desired product, but these temperatures are also conductive to formation of polymeric residues so that less starting material may be recoverable.

The substituted acid product or the alkyl ester thereof, depending upon the starting compound, may be separated from the reaction mixture by direct extraction with an inert solvent such as a hydrocarbon, or, after quenching the reaction mixture in water, by a greater variety of solvents. The solvent is removed by evaporation and the unreacted phenol or phenyl ether separated by distillation. Arylthiol, hydroxy aryl or alkoxy aryl derivatives of the fatty acid may be further purified if desired, but for many uses, such as the preparation of alkyl esters, purification is not necessary.

Alkyl esters of the fatty acid product are readily prepared, for example, by refluxing the fatty acid product with an anhydrous alcohol in the presence of a catalyst such as p-toluenesulfonic acid. Alkyl ester products are conveniently separated and purified by fractional distillation.

Although it is assumed that the addition of the arylthiol, phenol, phenyl ether, naphthalenethiol or naphthol takes place at the site of the original unsaturation, for example, at either the 9 or 10 position in the carbon chain of oleic acid, there is the possibility of shifting of the double bond with the result that minor quantities of other isomers may be produced.

Illustrative of the invention is the preparation of derivatives of oleic acid. The oleic acid (98+%) was essentially free of polyunsaturated acids and contained not more than 1.0% saturated acids, although such high purity is not critical to the operation of this invention. The arylthiols, phenols, phenyl ethers and the methanesulfonic acid were the best commercial grades obtainable and were used as received.

EXAMPLE 1

A mixture of 28.2 gm. (0.1 mole) of oleic acid and 43.2 gm. (0.4 mole) of m-cresol was added slowly, with rapid stirring, to a flask containing 60 g. (0.624 mole) of methanesulfonic acid. Since only a slight exotherm was observed, no external cooling was necessary. Stirring of the reaction mixture was continued for six hours. At the conclusion of this period the contents of the reaction flask were poured on to cracked ice. After standing overnight, the organic layer was extracted with three 150 ml. portions of ether and the ether solution freed of acid by washing with 20% aqueous sodium sulfate solution. The ether extract, after drying over anhydrous sodium sulfate was evaporatively distilled. The excess of m-cresol in the residue was removed by reduced pressure distillation. The resulting crude substituted stearic acid was esterified by adding 40 ml. of absolute methanol, 0.8 gm. of p-toluenesulfonic acid and refluxing the mixture for eight hours. After washing out the catalyst the ester was recovered in the usual manner. The crude ester was vacuum fractionated using a flask equipped with an alembic head. The fraction boiling between 165 and 250° C., chiefly between 199 and 203° C., at 0.08 mm. mercury pressure, was the main product. The weight of the fraction was 27.96 gm. (69% yield). As presented in Table I as Product No. 3, this fraction had a saponification equivalent of 393 (theory 405).

EXAMPLE 2

As an alternate procedure, the phenolic addition product can be extracted from the methanesulfonic acid solvent-catalyst medium by means of inert solvents. A mixture of 120 gms. of methanesulfonic acid, 56.4 gm. of oleic acid and 86.4 gms. of m-cresol were stirred for 6 hours. At the end of the stirring period the reaction mixture was divided into two equal parts. One-half was added to ice and the addition product obtained as described above. The remaining half of the reaction mixture was extracted 4 times with 250 ml. portions of Skelly B. The Skelly B extracts were combined and water washed. The solvent was removed by evaporation and the unreacted m-cresol in the residue removed by reduced pressure distillation. Following esterification with methanol, the addition product was obtained by fractional distillation under vacuum. Yield 18.4 gm. (45.5% of theory). Saponification equivalent 397 (theory 405).

To demonstrate that the methanesulfonic acid can be used for additional runs, the following experiments are typical.

EXAMPLE 3

To the methanesulfonic acid recovered from a previous extraction experiment were added: 28.2 gm. of oleic acid and 43.2 gm. of m-cresol. The mixture was stirred 6 hours and then extracted with Skelly B as described in Example 2. The addition product, after recovery as described above weighed 20.9 gms. (51.6% of theory) and had a saponification equivalent of 398 (theory 405).

EXAMPLE 4

The methansulfonic acid from Example 3 was used again with the same quantity of reactants. The yield of addition product was 21.3 gms. (52.6% of theory) and had a saponification equivalent of 415 (theory 405).

EXAMPLE 5

Oleic acid, 28.2 gm., 50 gm. of phenetole, and 60 gm. of methanesulfonic acid were combined at room temperature and stirred for 6 hours. The procedure of Example 1 was followed for separating the substituted acid product from the reaction mixture and for the preparation and separation of the methyl ester. The distilled methyl ester weighed 18.8 gm., a 45% yield, and had a saponification equivalent of 417 (theory 419). This product is number 5 in Table I.

In a similar manner other phenol, phenyl ether, and naphthol derivatives of oleic acid were prepared and converted to their methyl esters. Some of the products and pertinent information concerning them are presented in Table I. The procedure of Example 1 was varied in preparing the 2-naphthol addition product (number 2 in Table I). The excess of naphthol was not removed prior to esterification.

The procedure of Example 1 was employed in preparing the methyl esters of arylthio stearic acids of Table II. In several instances, as in obtaining products 8, 12, 13 and 14, the methyl ester was separated by molecular distillation.

The analytical data of Table II show that good yields of these addition products can be prepared and separated. The products of Table II are considered to be thioethers, since ethanolic iodine titrations were negative. Rearrangements of thioethers similar to those of the phenolic addition products would give titratable free mercapto (—SH) groups. The difference between analogous sulfur- and oxygen-containing adducts and reaction products is further demonstrated by the failure of thioanisole to give an addition product (15) whereas phenolic ethers such as anisole and phenetole could be added successfully (4 and 5) under similar conditions.

Table I.—Methyl esters of substituted phenylstearic acids

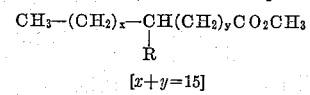

$[x+y=15]$

| Product No. | R[a] | Temp. of reaction | Distillate | | | Residue | | | Theory | | $N_D^{30}$ |
|---|---|---|---|---|---|---|---|---|---|---|---|
| | | | Percent yield | Percent OH | Sap. equiv. | Percent yield | Percent OH | Sap. equiv. | Percent OH | Sap. equiv. | |
| 1 | ⟨⟩OH | Room / do | Not distilled. | | | 71.6 / 83.3 | 4.15 / 4.83 | 352 / 386 | 4.35 | 391 | 1.4921 |
| 2 | ⟨⟩⟨⟩OH | Room | 32.7 | 3.56 | 428 | 27.5 | --- | 375 | 3.86 | 440 | --- |
| 3 | CH₃-⟨⟩OH | Room / do | 54.2 / 69.0 | 4.26 / 4.60 | 398 / 393 | 21.3 / 22.1 | 3.1 / 3.6 | 400 / 399 | 4.20 | 405 | 1.4860 |
| 4 | ⟨⟩OCH₃ | Room / Steam bath | 39.8 / 47.5 | --- | 380 / 400 | 25.9 / 31.4 | --- | 354 / 900 | --- | 405 | 1.4782 |
| 5 | ⟨⟩OC₂H₅ | Room | 44.9 | --- | 417 | 25.5 | --- | 490 | --- | 419 | 1.4812 |
| 6 | HO⟨⟩OH, C(CH₃)₃ | do | 54.8 | (b) | (b) | --- | --- | --- | --- | --- | 1.4925 |

[a] The formulas shown are intended only to indicate the radical attached and not necessarily the point of attachment.
[b] Could not be determined either colorimetrically or potentiometrically; carbon, percent, found, 75.4; theory, 75.3; Hydrogen percent, found, 11.0; theory 10.9.

Table II.—Methyl esters of arylthio stearic acids

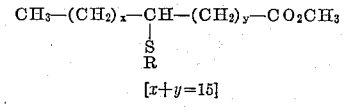

$[x+y=15]$

| Product No. | RSH | Boiling range | | Yield, percent | Saponification equivalent | | Carbon, percent | | Hydrogen, percent | | Sulfur, percent | |
|---|---|---|---|---|---|---|---|---|---|---|---|---|
| | | °C. | mm. | | Calc. | Found | Calc. | Found | Calc. | Found | Calc. | Found |
| 7 | ⟨⟩SH | 170–195 | 0.1 | 60 | 407 | 385 | 73.83 | 73.73 | 10.41 | 10.43 | 7.88 | 8.10 |
| 8 | SH-⟨⟩-C(CH₃)₃ | Molecularly distilled | | 70 | 463 | 450 | 75.26 | 74.56 | 10.89 | 10.74 | 6.93 | 7.09 |
| 9 | ⟨⟩SH, CH₃ | 170–205 | 0.1 | 37 | 421 | 378 | 74.23 | 73.62 | 10.54 | 10.73 | 7.62 | 8.66 |
| 10 | ⟨⟩SH, CH₃ | 185–207 | 0.1 | 63 | 421 | 388 | 74.23 | 74.31 | 10.54 | 10.76 | 7.62 | 7.54 |
| 11 | CH₃-⟨⟩SH | 170–205 | 0.1 | 52 | 421 | 394 | 74.23 | 74.07 | 10.54 | 10.65 | 7.62 | 7.49 |
| 12 | ⟨⟩⟨⟩SH | Molecularly distilled | | 48 | 457 | 440 | 76.03 | 76.26 | 9.71 | 9.74 | 7.02 | 7.01 |
| 13 | ⟨⟩SH, COOCH₃ | Molecularly distilled | | 40 | 232 | 229 | 69.78 | 69.50 | 9.54 | 9.66 | 6.90 | 6.83 |
| 14 | Cl-⟨⟩SH[a] | Molecularly distilled | | 37 | 441 | 431 | 68.07 | 67.86 | 9.37 | 9.38 | 7.27 | 7.17 |
| 15 | ⟨⟩SCH₃ | No addition product | | --- | --- | --- | --- | --- | --- | --- | --- | --- |

[a] Analysis of product for chlorine calc. 8.04%, found 8.19%.

We claim:

1. A process for preparing addition products comprising reacting an olefinically unsaturated compound selected from the group consisting of an olefinically unsaturated fatty acid and an alkyl ester thereof, with an aromatic compound selected from the group consisting of a phenol, a phenyl ether, and an arylthiol in an amount at least in excess of a molar equivalent for each double bond in said olefinically unsaturated compound, in a reaction medium comprising methanesulfonic acid, and separating the resulting addition product from the reaction mixture.

2. The process of claim 1 wherein the olefinically unsaturated compound is oleic acid.

3. The process of claim 1 wherein the aromatic compound is phenol.

4. The process of claim 1 wherein the aromatic compound is 2-naphthol.

5. The process of claim 1 wherein the aromatic compound is methoxybenzene.

6. The process of claim 1 wherein the aromatic compound is benzenethiol.

7. The process of claim 1 wherein the aromatic compound is 2-naphthalenethiol.

8. A process for preparing addition products comprising reacting an olefinically unsaturated compound selected from the group consisting of an olefinically unsaturated fatty acid and an alkyl ester thereof, with an aromatic compound selected from the group consisting of phenol, cresol, xylenol, mesitol, thymol, catechol, resorcinol, orcinol, t-butylcatechol, dihydroxyxylol, 2-naphthol, methoxybenzene, ethoxybenzene, benzenethiol, o-toluenethiol, m-toluenethiol, p-toluenethiol, m-t-butylbenzenethiol, p-chlorobenzenethiol, 2-naphthalenethiol, and o-carbomethoxybenzenethiol in an amount at least in excess of a molar equivalent for each double bond in said olefinically unsaturated compound, in a reaction medium comprising methanesulfonic acid, and separating the resulting addition product from the reaction mixture.

9. A process of preparing an alkyl ester of the addition product of an olefinically unsaturated fatty acid and an aryl compound, comprising reacting an olefinically unsaturated fatty acid with an aryl compound selected from the group consisting of a phenol, a phenyl ether, and an arylthiol in an amount at least in excess of a molar equivalent for each double bond in said acid, in a reaction medium comprising methanesulfonic acid, separating the resulting addition product from the reaction mixture, esterifying the addition product with a short carbon chain alkanol, and separating the resulting alkyl ester of the addition product from the esterification reaction mixture.

10. The process of claim 1 wherein the esterifying alcohol is methanol.

11. A process of preparing an alkyl ester of the addition product of an olefinically unsaturated fatty acid and an aryl compound, comprising reacting an olefinically unsaturated fatty acid with an aryl compound selected from the group consisting of phenol, cresol, xylenol, mesitol, thymol, catechol, resorcinol, orcinol, t-butylcatechol, dihydroxyxylol, 2-naphthol, methoxybenzene, ethoxybenzene, benzenethiol, o-toluenethiol, m-toluenethiol, p-toluenethiol, m-t-butylbenzenethiol, p-chlorobenzenethiol, p-chlorobenzenethiol, 2-naphthalenethiol, and o-carbomethoxybenzenethiol in an amount at least in excess of a molar equivalent for each double bond in said acid, in a reaction medium comprising methanesulfonic acid, separating the resulting addition product of the acid and aryl compound from the reaction mixture, esterifying the addition product with a short carbon chain alkanol, and separating the resulting alkyl ester of the addition product from the esterification reaction mixture.

12. A process for preparing addition products comprising reacting an olefinically unsaturated compound selected from the group consisting of oleic acid, acrylic acid, crotonic acid, tiglic acid, erucic acid, brassidic acid, sorbic acid, linoleic acid, linolenic acid, and arahidonic acid, and the methyl, ethyl, isopropyl, and t-butyl esters of said acids, with an aromatic compound selected from the group consisting of phenol, cresol, xylenol, mesitol, thymol, catechol, resorcinol, orcinol, t-butylcatechol, dihydroxyxylol, 2-naphthol, methoxybenzene, ethoxybenzene, benzenethiol, o-toluenethiol, m-toluenethiol, p-toluenethiol, m-t-butylbenzenethiol, p-chlorobenzenethiol, 2-naphthalenethiol, and o-carbomethoxybenzenethiol in an amount at least in excess of a molar equivalent for each double bond in said olefinically unsaturated compound, in a reaction medium comprising methanesulfonic acid, and separating the resulting addition product from the reaction mixture.

13. A process of preparing an alkyl ester of the addition product of an olefinically unsaturated fatty acid and an aryl compound, comprising reacting an olefinically unsaturated fatty acid selected from the group consisting of oleic acid, acrylic acid, crotonic acid, tiglic acid, erucic acid, brassidic acid, sorbic acid, linoleic acid, linolenic acid, and arachidonic acid, with an aryl compound selected from the group consisting of phenol, cresol, xylenol, mesitol, thymol, catechol, resorcinol, orcinol, t-butylcatechol, dihydroxyxylol, 2-naphthol, methoxybenzene, ethoxybenzene, benzenethiol, o-toluenethiol, m-toluenethiol, p-toluenethiol, m-t-butylbenzenethiol, p-chlorobenzenethiol, 2-naphthalenethiol, and o-carbomethoxybenzenethiol in an amount at least in excess of a molar equivalent for each double bond in said acid, in a reaction medium comprising methanesulfonic acid, separating the resulting addition product from the reaction mixture, esterifying the addition product with a short carbon chain alkanol selected from the group consisting of methanol, ethanol, isopropanol, and t-butanol, and separating the resulting alkyl ester of the addition product from the esterification reaction mixture.

14. The process of claim 13 wherein the esterifying alcohol is methanol.

References Cited by the Examiner

UNITED STATES PATENTS

| | | | |
|---|---|---|---|
| 1,972,568 | 9/34 | McKee | 260—413 |
| 2,246,762 | 6/41 | Schirm | 260—410.5 |
| 2,475,916 | 7/49 | Reiff et al. | 260—413 |
| 2,533,939 | 12/50 | Jenner | 260—497 |
| 2,692,232 | 10/54 | Bartlett et al. | 260—413 |

CHARLES B. PARKER, *Primary Examiner.*

DANIEL D. HORWITZ, *Examiner.*